United States Patent Office 3,260,696
Patented July 12, 1966

3,260,696
CIS-POLYBUTADIENE COMPOSITIONS
Robert C. Wheat, Bartlesville, Okla., assignor to Phillips Petroleum Company, a corporation of Delaware
No Drawing. Filed Dec. 27, 1960, Ser. No. 78,323
7 Claims. (Cl. 260—41.5)

This invention relates to rubbery compositions containing cis-polybutadiene. In one aspect, the invention relates to cis-polybutadiene compositions which contain an additive material to prevent cold-flow of the rubber.

In recent years there has been a great deal of activity in the development of process for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has also aroused considerable interest. The polymers formed by the use of these catalysts often have outstanding physical properties which render them superior to natural rubber. A particularly outstanding product obtained by the use of certain stereospecific catalysts is a polybutadiene containing at least 85 percent cis 1,4-addition. This cis-polybutadiene product possesses outstanding physical properties which render the polymer suitable for use in the fabrication of heavy duty tires and other articles for which other synthetic rubbers have heretofore been generally unsuitable. However, when using conventional techniques in packaging, shipping and storing the cis-polybutadiene, a problem has arisen because of the tendency of the rubber to cold-flow in the unvulcanized state. For example, if a hole develops in the package in which the cis-polymer is being stored, polymer will flow through the hole, resulting in product loss or contamination or sticking together of the packages.

It is an object of this invention, therefore, to provide a cis-polybutadiene composition in which the tendency to cold-flow has been eliminated or substantially reduced.

Another object of the invention is to provide a method for reducing the tendency of a cis-polybutadiene to cold-flow.

Other and further objects and advantages of the invention will become apparent to those skilled in the art upon consideration of the accompanying disclosure.

Broadly speaking, the present invention resides in a composition of matter comprising a cis-polybutadiene and in the range of 0.5 to 5.0 parts by weight per 100 parts of the total composition of an inorganic oxide selected from the group consisting of silica, alumina and titania. It is to be understood that mixtures of the inorganic oxide can be employed. It is usually preferred to employ from 1.0 to 3.0 parts by weight of the inorganic oxide per 100 parts of the total composition. It has been discovered that by incorporating the inorganic oxide in the cis-polybutadiene rubber it is possible to eliminate or substantially reduce the tendency of the polymer to cold-flow. Furthermore, the addition of the inorganic oxide does not adversely affect the Mooney value of the polymer. As used herein, the term "cis-polybutadiene" is intended to designate a polybutadiene containing at least 85 percent, e.g., in the range of 85 to 99 percent and higher, cis 1,4-addition.

The cis-polybutadiene employed in preparing the composition of this invention can be produced by any method known in the art. A process for preparing a polybutadiene containing at least 85 percent cis 1,4-addition is described in the copending application of R. P. Zelinski and D. R. Smith, Serial No. 578,166, filed on April 16, 1956. According to the process described in the application, 1,3-butadiene is polymerized in the presence of a catalyst composition comprising a trialkylaluminum and titanium tetraiodide. The polybutadiene produced by this method is one in which the rubbery polybutadiene is formed by cis 1,4-addition, trans 1,4-addition and 1,2-addition, at least 85 percent of the polymer being formed by cis 1,4-addition. The polymerization can be carried out at a temperature in the range of 0 to 150° C. and it is usually preferred to employ a hydrocarbon diluent. Examples of other catalyst systems which can be used to produce a polybutadiene containing at least 85 percent cis 1,4-addition include a catalyst comprising an organoaluminum compound, titanium tetrachloride and titanium tetraiodide and a catalyst comprising an organoaluminum compound, titanium tetrachloride and iodine. Still another method for preparing a high cis-content polybutadiene uses a cobalt-type catalyst as described in the copending U.S. patent application Serial No. 73,505, filed by R. P. Zelinski on December 5, 1960. In accordance with the method described in this application, a very high cis-polybutadiene is prepared by polymerizing 1,3-butadiene with a catalyst comprising an alkylaluminum dihalide and the reaction product of a cobaltous compound with ammonia or an amine. A preferred catalyst system comprises ethylaluminum dichloride and the reaction product of cobaltous chloride and pyridine. When utilizing this catalyst system to prepare a high cis-polybutadiene, the preferred procedure is to charge the cobaltous chloride and pyridine to a reactor containing a hydrocarbon diluent. Thereafter, the ethylaluminum dichloride and the 1,3-butadiene are charged to the reactor in that order. When preparing a high cis-content polybutadiene by this process, the polymerization is preferably carried out at a low temperature, e.g., at a temperature of 20° F. and below. A very high cis-content polybutadiene can also be prepared in accordance with the above-described Zelinski and Smith method by conducting the polymerization at a very low temperature, e.g., at −30° C.

The composition of this invention can be prepared by any known method suitable for blending materials. In a preferred method of operation, the inorganic oxide is reduced to a fine powder, generally having a particle size in the range of about 200 to 5000 Angstrom units. Optimum results are obtained when the diameter of the particles are in the lower end of the aforementioned range. The inorganic oxide in finely divided form is then incorporated in the polymer by any suitable mixing means, such as on a roll mill or in a Banbury mixer. In another suitable method, the inorganic oxide is incorporated in the polymer by utilizing a solution technique. According to this method, the inorganic oxide is mixed with the polymer while it is still in solution in the polymerization solvent. Thereafter, the polymer containing the inorganic oxide is recovered from solution by any suitable method. In one suitable recovery method, the solvent is removed by steam stripping. In another method, the polymer is precipitated from solution by adding an alcohol after which the polymer is recovered by filtration or decantation.

The rubbery compositions of this invention have utility in applications where natural and synthetic rubbers are used. They can be used in the manufacture of automobile tires and other rubber articles, such as gaskets. It is to be understood that vulcanization accelerators, vulcanizing agents, reinforcing agents and fillers, such as have been used in natural rubber, can be used when compounding the compositions of this invention.

A more comprehensive understanding of the invention can be obtained by referring to the following illustrative examples which are not intended, however, to be unduly limitative of the invention. The microstructures of the polymers used in preparing the compositions described in the examples were determined by infrared analysis according to the method of Silas, Yates and Thornton, Analytical Chemistry, 31, 529 (1959).

EXAMPLE I

A polybutadiene was prepared by polymerizing 1,3-butadiene with a catalyst consisting of triisobutylaluminum and titanium tetraiodide. Infrared examination of this polybutadiene gave the following results:

*Microstructure, percent*

Cis _____ 93.6
Trans _____ 3.1
Vinyl _____ 3.3

Samples of this cis-polybutadiene were blended with hydrated silica on a roll mill. The hydrated silica used had the following properties:

Average particle size, microns _____ 0.22
Bulk density, lbs./cu. ft. _____ 10
Specific gravity _____ 1.95
Surface area, sq. meters/gram _____ 150

One sample was prepared in which 2.5 weight percent silica per 100 parts of the total composition was used. In the other sample, 5 parts by weight of the silica was employed. Pellets having a diameter of about 0.25 inch were prepared from each sample, and the height of each pellet was accurately measured. These pellets were then placed in a Goodrich plastometer under the weight of only the small plunger (i.e., additional weight not added). The pellets were maintained under the plunger at a temperature of 80° F. for 2 hours. At the end of this period, the pellets were removed and their height was again measured. The ratio of the original height ($H_o$) to the height after 2 hours in the plastometer ($H_f$) was then calculated.

Control runs were also conducted in which samples of the cis-polybutadiene prepared as described above and a cis-polybutadiene having a Mooney value of 52 were evaluated in the same manner. The latter polymer, which was also prepared by polymerizing butadiene with a triisobutylaluminum-titanium tetraiodide catalyst, by infrared examination contained 95.5 percent cis 1,4-addition, 1.3 percent trans 1,4-addition, and 3.2 percent 1,2-addition (vinyl).

The results of the several tests are shown below in the table.

mercial silica per 100 parts by weight of the total composition. The silica used had a particle size in the range of 0.015 to 0.020 micron and a surface area of 175 to 200 square meters per gram. The cis-polybutadiene had a Mooney value (ML–4 at 212° F.) of 45 while the blends containing 2 and 4.5 parts of silica had Mooney values of 47 and 51, respectively.

The blending of the materials was carried out on a roll mill. Pieces which were 2 inches square by 1½ inches high were prepared from the blends and from a sample containing no silica. These samples were placed on polyethylene film, and after about 48 days at room temperature the area covered by each of the samples was measured to determine the amount of flow which had occurred during the period. The sample containing 2 parts by weight of silica covered an area of 9.6 square inches while the sample containing 4.5 parts of silica covered an area of 7 square inches. During this period, the cis-polybutadiene containing no silica had spread from 4 square inches to 12.7 square inches. These data demonstrate that the presence of the additive material was effective in reducing the tendency of the cis-polybutadiene to cold-flow.

As will be evident to those skilled in the art, many variations and modifications of this invention can be practiced in view of the foregoing disclosure. Such variations and modifications are believed to come within the spirit and scope of the invention.

I claim:

1. A method for reducing the tendency of a cis-polybutadiene to cold-flow which comprises blending a polybutadiene containing at least 85 percent cis 1,4-addition with an inorganic oxide selected from the group consisting of silica, alumina and titania, the amount of said inorganic oxide being in the range of 0.5 to 5.0 parts by weight per 100 parts by weight of the total of said polybutadiene and said inorganic oxide.

2. A composition of matter comprising a cis-polybutadiene and in the range of 0.5 to 5.0 parts by weight per 100 parts of the total composition of an inorganic oxide selected from the group consisting of silica, alumina and titania.

3. A composition of matter comprising a polybutadiene containing at least 85 percent cis 1,4-addition and in the range of 0.5 to 5.0 parts by weight per 100 parts of the total composition of an inorganic oxide selected from the group consisting of silica, alumina and titania.

4. A composition of matter according to claim 3 in

TABLE

| Polymer No. | Mooney [1] (ML–4 @ 212° F.) | cis-Content (percent) | Silica (phr.) | Mooney (ML–4 @ 212° F.) | $H_o$ (in.) | $H_f$ (in.) | $H_o/H_f$ |
|---|---|---|---|---|---|---|---|
| 1 | 42 | 93.6 | 2.5 | 45 | 0.307 | 0.270 | 1.14 |
| 2 | 42 | 93.6 | 5.0 | 49 | 0.314 | 0.277 | 1.13 |
| 3 (Control) | 42 | 93.6 |  | 42 | 0.313 | 0.242 | 1.29 |
| 4 (Control) | 52 | 95.5 |  | 52 | 0.314 | 0.257 | 1.24 |

[1] ASTM D927–55T.

were blended with 2.0 and 4.5 parts by weight of a com-

The data in the foregoing table show that by blending small amounts of silica with cis-polybutadiene, the tendency of the polymer to cold flow was substantially reduced.

EXAMPLE II

A cis-polybutadiene was prepared by polymerizing 1,3-butadiene with a catalyst consisting of triisobutylaluminum, titanium tetraiodide and titanium tetrachloride. The infrared examination of the polymer indicated that it contained 95.3 cis 1,4-addition. Samples of this polymer which the amount of said inorganic oxide is in the range of 1.0 to 3.0 parts by weight per 100 parts of the total composition.

5. A composition of matter according to claim 3 in which said inorganic oxide is silica.

6. A composition of matter according to claim 3 in which said inorganic oxide is alumina.

7. A composition of matter according to claim 3 in which said inorganic oxide is titania.

(References on following page)

References Cited by the Examiner

UNITED STATES PATENTS

| | | | |
|---|---|---|---|
| 2,797,204 | 6/1957 | Shepard et al. | 260—41.5 |
| 2,828,272 | 3/1958 | Ullrich | 260—41.5 |
| 2,846,427 | 8/1958 | Findlay | 260—94.3 |
| 2,888,424 | 5/1959 | Precopio et al. | 260—41.5 |
| 2,894,929 | 7/1959 | Newton et al. | 260—41.5 |
| 2,953,555 | 9/1960 | Miller et al. | 260—94.3 |
| 2,959,563 | 11/1960 | Haehn et al. | 260—41 |
| 2,970,134 | 1/1961 | Anderson | 260—94.3 |

OTHER REFERENCES

Krans et al., Rubber and Plastics Age, 38, October 1957, pages 880–891.

Railsback et al., Rubber World, 138, April 1958, pages 75–80 and 84.

MORRIS LIEBMAN, *Primary Examiner.*

LEON J. BERCOVITZ, *Examiner.*

R. C. STEWART, K. B. CLARKE, J. S. WALDRON, *Assistant Examiners.*